United States Patent
Stellwag et al.

(10) Patent No.: US 9,879,351 B2
(45) Date of Patent: Jan. 30, 2018

(54) METHOD FOR PROTECTING COMPONENTS OF A PRIMARY SYSTEM OF A BOILING WATER REACTOR IN PARTICULAR FROM STRESS CORROSION CRACKING

(71) Applicant: AREVA NP Inc., Lynchburg, VA (US)

(72) Inventors: Bernhard Stellwag, Nuremberg (DE); Wilfried Ruehle, Eppelheim (DE)

(73) Assignee: AREVA Inc., Lynchburg, VA (US)

( * ) Notice: Subject to any disclaimer, the term of this patent is extended or adjusted under 35 U.S.C. 154(b) by 646 days.

(21) Appl. No.: 13/913,633

(22) Filed: Jun. 10, 2013

(65) Prior Publication Data

US 2013/0272476 A1 Oct. 17, 2013

Related U.S. Application Data

(63) Continuation of application No. 11/820,966, filed on Jun. 21, 2007, now abandoned, which is a (Continued)

(30) Foreign Application Priority Data

May 15, 2001 (DE) .................................. 101 23 690

(51) Int. Cl.
*C23F 11/00* (2006.01)
*C23F 11/12* (2006.01)
(Continued)

(52) U.S. Cl.
CPC ............ *C23F 11/00* (2013.01); *C23F 11/122* (2013.01); *G21C 15/28* (2013.01);
(Continued)

(58) Field of Classification Search
CPC ........ C23F 11/00; C23F 11/122; G21C 15/28; G21C 17/0225; G21C 19/28;
(Continued)

(56) References Cited

U.S. PATENT DOCUMENTS 5,135,709 A * 8/1992 Andresen et al. ............ 376/305
5,600,692 A * 2/1997 Hettiarachchi ............... 376/305
(Continued)

OTHER PUBLICATIONS

Y.J. Kim, "Effect of Noble Metal Addition on Electrochemical Polarization Behavoir of Hydrogen Oxidation and Oxygen Reduction on Type 304 Stainless Steel in High-Temperature Water", Corrosion, May 1999.*

(Continued)

*Primary Examiner* — Frank J McGue
(74) *Attorney, Agent, or Firm* — Davidson, Davidson & Kappel, LLC

(57) ABSTRACT

A method for protecting the components of the primary system of a boiling water reactor, especially against stress cracking corrosion, includes feeding a reducing agent into the primary coolant in order to reduce the number of substances having a oxidizing effect or in order to modify the electrochemical potential of the component surfaces covered with an oxide layer to negative values. An alcohol that can be oxidized in the conditions of a reactor is fed in as a reducing agent, preferably in a liquid form, into the primary coolant. The component surfaces are provided with a blank coating or a single intrinsic oxide coating.

15 Claims, 2 Drawing Sheets

Related U.S. Application Data continuation of application No. 10/715,069, filed on Nov. 17, 2003, now abandoned, which is a continuation of application No. PCT/EP02/05274, filed on May 14, 2002.

(51) Int. Cl.
    *G21C 15/28*     (2006.01)
    *G21C 17/022*     (2006.01)
    *G21C 19/28*     (2006.01)

(52) U.S. Cl.
    CPC ......... *G21C 17/0225* (2013.01); *G21C 19/28* (2013.01); *G21Y 2002/103* (2013.01); *G21Y 2004/10* (2013.01); *G21Y 2004/303* (2013.01); *Y02E 30/31* (2013.01)

(58) Field of Classification Search
    CPC ......... G21Y 2002/103; G21Y 2004/10; G21Y 2004/303; Y02E 30/31
    USPC ........................................................ 376/306
    See application file for complete search history.

(56) References Cited

U.S. PATENT DOCUMENTS

| | | | | |
|---|---|---|---|---|
| 5,768,330 | A * | 6/1998 | Andresen et al. | 376/305 |
| 5,793,830 | A * | 8/1998 | Kim et al. | 376/305 |
| 5,818,893 | A * | 10/1998 | Hettiarachchi | 376/305 |
| 6,724,854 | B1 * | 4/2004 | Kim et al. | 376/306 |
| 6,940,939 | B1 * | 9/2005 | Ichikawa et al. | 376/305 |
| 2002/0101953 | A1 * | 8/2002 | Hettiarachchi et al. | 376/306 |
| 2003/0012686 | A1 * | 1/2003 | Andresen et al. | 422/14 |
| 2005/0135542 | A1 * | 6/2005 | Stellwag et al. | 376/277 |

OTHER PUBLICATIONS

Thefreedictionary.com, accessed at http://www.thefreedictionary.com/noble+metal accessed Mar. 17, 2017.*
Johnson Matthey, Precious Metals Management, "Properties of platinum group metals," accessed Feb. 21, 2017 at http://www.platinum.matthey.com/about-pgm/applications/properties-of-pgm.
ScienceViews.com, "Platinum-Group Metals," accessed Feb. 21, 2017 at http://scienceviews.com/geology/platinum.html.
U.S. Nuclear Regulatory Commission letter dated Jan. 30, 2001 and directed to the subject of "Safety Evaluation of Proprietary EPRI Report TR 108705, "BWR Vessel and Internals Project, Technical Basis for Inspection Relief for BWR Internal Components With Hydrogen Injection (BWRVIP-62)" (TAC No. MA4468)".
Radiological Technical Specifications for the Nine Mile Point nuclear station unit 1 issued by the U.S. NRC on Dec. 26, 1974.
EPRI Report BWRVI-79 TR-103515-R2 dated Mar. 2000.
Hettairachchi et al., "Noble Metal Technique Cuts Corrosion and Radiation", Power Engineering, Nov. 1, 1998, accessed Feb. 21, 2017 at http://www.power-eng.com/articles/print/volume-102/issue-11/features/noble-metal-technique-cuts-corrosion-and-radiation.html.
U.S. NRC inspection report dated Oct. 1999.
Southern Company letter dated Sep. 2001.

\* cited by examiner

METHOD FOR PROTECTING COMPONENTS OF A PRIMARY SYSTEM OF A BOILING WATER REACTOR IN PARTICULAR FROM STRESS CORROSION CRACKING

This is a continuation of U.S. patent Ser. No. 11/820,966, filed Jun. 21, 2007, which is a continuation of U.S. patent Ser. No. 10/715,069, filed Nov. 17, 2003, which is a continuation of International Application No. PCT/EP02/05274, filed May 14, 2002, all of which are incorporated by reference herein.

BACKGROUND

The invention lies in the boiling water reactor technology field. More specifically, the invention relates to a method for protecting the components of the primary system of a boiling water reactor in particular from stress corrosion. In a boiling water reactor, the coolant which comes into contact with the reactor core is known as primary coolant, and the lines and components which are exposed to the primary coolant are known as the primary system. In addition to the reactor pressure vessel, the primary system of a boiling water reactor includes systems of lines as well as various internal fittings and pumps. The components generally consist of stainless steel, for example of a CrNi steel, or an Ni-base alloy, such as Inconel® 600 (Inco Alloys International, Inc.). Radiolysis of the primary coolant causes, inter alia, the reaction products hydrogen peroxide, oxygen, and hydrogen to form in the boiling water reactor. The oxidizing conditions which result from the excess of oxidizing agents promote corrosion, in particular stress corrosion cracking, of the components. To remedy this, it is known to admix hydrogen with the primary coolant. This bonds oxidizing agents contained in the primary coolant and shifts the electrochemical potential of the component surfaces toward negative values. A drawback of the conventional method is that relatively large quantities of hydrogen are required to ensure sufficient protection against corrosion. The high demand for hydrogen, which entails corresponding costs, is attributable not least to the fact that the electrochemical oxidation of the hydrogen on the component surfaces which are covered with an oxide layer is subject to considerable reaction inhibition, and this has to be compensated for by increased hydrogen concentrations. A further drawback is the outlay on apparatus for metering the gaseous hydrogen.

European patent disclosure EP 0736878 describes a method in which the oxide layer of the component surfaces in the primary System is doped with precious metal, which makes it possible to use smaller quantities of hydrogen. German published patent application DE 100 30 726 A1 describes a method in which the quantities of hydrogen and precious metal are supposed to be reduced by coating the component surfaces with a film which includes a substance with a photocatalytic action. The substances with photocatalytic action that are used—preferably $TiO_2$ and $ZrO_2$—are N-type semiconductors which are excited by the Cherenkov radiation which is present in the reactor, shifting the corrosion potential of the component surfaces toward negative values.

Soviet Union patent disclosure SU 653953 describes a system having to do with what is referred to in the document as "boiling nuclear reactors." There, an alcohol is added into the primary coolant instead of hydrazine. While relatively little information is presented in the document concerning the operational setup of the reactor, certain statements strongly suggest that the boiling reactor of the prior art publication is not a boiling water reactor according to the Western understanding. One such hint is that the publication states that, in its prior art, hydrazine had been introduced in such boiling nuclear reactors during the reactor operation for the purpose of providing corrosion protection. The addition of hydrazine, however, during the operation of a boiling water reactor would be entirely prohibited.

The Soviet document discloses corrosion protection measures by way of the addition of alcohol in the coolant/moderator. The specific concentration disclosed is approximately 10 to $10^5$ μmol/kg (≈0.32 to 3200 ppm for methanol) in order to completely prevent oxygen formation during the radiolysis of the coolant. In order to ensure this, the disclosed alcohol concentration must necessarily be present at those locations at which the radiolysis processes are the strongest, that is, at the fuel rods in the reactor core.

A problem associated with very high alcohol concentration is that a relatively large portion of the alcohol remains unused, i.e., it is not oxidized by radiolysis oxygen or decomposed by the radiolysis, it subsequently passes through a phase change into the vapor phase and then reaches the steam turbine and the condenser downstream of the steam turbine. There, the alcohol is cooled to about 40° C. At this temperature, only a small proportion of the alcohol is dissolved in the liquefied condensate which is fed back into the reactor pressure vessel in the form feedwater. The by far largest proportion is contained in the vapor phase. The latter is not simply let go into the environment but it is transported via an off-gas path within which a catalytic recombination of hydrogen and oxygen to water is effected. An alcohol component in the vapor phase could, on the one hand, disturb the recombination. On the other hand, additional functional elements and processing steps would have to be provided in order to hold back the alcohol or to convert the same into a non-damaging form.

High alcohol contents, furthermore, lead to radiolysis in the reactor due to the high radiation density, which results in products such as $CO_2$, formaldehyde, and formic acid. These products, of course, are undesirable in the reactor pressure vessel itself and in the downstream vapor carrying systems such as the condenser. Besides an increase in the conductivity of the primary coolant, they can lead to a decrease in the pH which has a negative effect on the component corrosion. Yet, it is exactly the component corrosion which is to be avoided or reduced with the addition of alcohol.

SUMMARY OF THE INVENTION

An object of the present invention is to provide a method for protecting the components of the primary system of a boiling water reactor which overcomes the above-mentioned disadvantages of the heretofore-known devices and methods of this general type and which ensures efficient protection against corrosion with little outlay on materials and time.

With the foregoing and other objects in view there is provided, in accordance with the invention, a method for protecting components of a primary system of a boiling water reactor having a pressure vessel and a feedwater line opening out into the pressure vessel. The novel method, which is particularly suitable to protect the components against stress corrosion cracking, comprises the following steps:

providing an alcohol that is oxidizable under operating conditions of the primary system;

feeding the alcohol into a primary coolant to establish an alcohol concentration of from 0.1 to 300 μmol/kg (≈0.0032 to 9.6 ppm for methanol) in a downcomer, the downcomer extending downward at an opening of the feedwater line, with surfaces of the components still being bright or covered only by a native oxide layer.

In accordance with an added feature of the invention, the alcohol concentration is adjusted to less than 10 μmol per kg (≈0.32 ppm for methanol).

In other words, the objects of the invention are achieved by a method in which an alcohol that can be oxidized under the conditions prevailing in the reactor system, preferably in liquid phase, is fed into the primary coolant instead of hydrogen, with the component surfaces being bright or being covered only by a native oxide layer. In this context, a native oxide layer is to be understood as meaning an oxide layer which forms as a result of corrosion to the component material, if appropriate with the intercalation of foreign metals or foreign metal oxides, during reactor operation or during an oxidizing pretreatment. It has been found that the metering-in of an alcohol of the above type as the only measure is sufficient to reduce the corrosion potential of the component surfaces to values of lower than −230 mV, and it is possible to dispense with complex coatings in particular comprising substances with a photocatalytic action.

The advantage of an alcohol over hydrogen as reducing agent is firstly that it can be metered in liquid form or as a solution. A liquid is more easy to feed into the primary coolant than a gaseous substance in terms of the apparatus required. Furthermore, the compounds mentioned offer advantages in terms of handling and storage. Finally, they are less expensive than hydrogen, with the result that the plant operating costs can also be reduced.

In accordance with a concomitant feature of the invention, the component surfaces are doped with precious metal, for example with Pt, with the result that a lower concentration of alcohol is required in the primary coolant.

The alcohol concentration is maintained at between 0.1 and 300 μmol per kg (≈0.0032 to 9.6 ppm for methanol) of the primary coolant and, in a preferred embodiment, it is maintained at less than 10 μmol/kg. It is expedient for the alcohol to be fed into the condensate or feedwater system. The quantity which is metered in is in this case such that the abovementioned concentration is established in the downcomer of the boiling water reactor. The downcomer is the area in the reactor pressure vessel which extends downward from the opening points of the feed tubes. It is preferable to use methanol, ethanol and propanol. However, formic acid, formaldehyde, and acetaldehyde are also eminently suitable.

As noted above, the metering-in of alcohol may lead to several disadvantageous results. That is, it is in effect a balancing act between the positive and the negative effects thereof. The instantly claimed invention provides a successful compromise with highly improved corrosion protection while the negative effects of the alcohol are virtually unnoticeable. This is particularly so when the alcohol concentration is maintained at below 10 μmol/kg (≈0.32 ppm for methanol).

Other features which are considered as characteristic for the invention are set forth in the appended claims.

Although the invention is illustrated and described herein as embodied in a method for protecting the components of the primary system of a boiling water reactor in particular from stress corrosion cracking, it is nevertheless not intended to be limited to the details shown, since various modifications and structural changes may be made therein without departing from the Spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION

Figure 1:
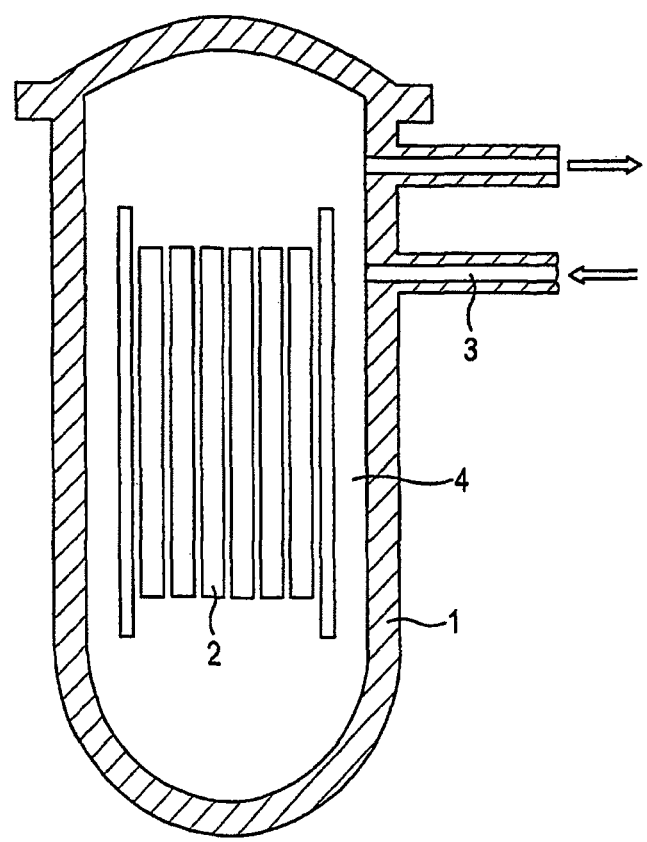
FIG. 1 is a diagrammatic longitudinal section taken through a boiling water reactor.

Referring now to the figures of the drawing in detail and first, particularly, to FIG. 1 thereof, there is shown a highly simplified illustration of a boiling water reactor. A pressure vessel 1 of the reactor houses fuel assemblies 2 or fuel elements. An alcohol of the above-mentioned type, preferably methanol, is injected into a feedline 3, which continues inside the pressure vessel in the form of an annular distributor line, to protect against corrosion and in particular against stress corrosion cracking (IGSCC). The reactor is in an operating state in which the components of the reactor, i.e. for example the pressure vessel 1 and the non-illustrated core grid, which usually consist of CrNi steel or an Ni-base alloy, are bright or are covered only with a native oxide layer. The former case occurs, for example, if an oxide layer has been removed from the component surfaces during maintenance work. The quantity injected into the feedline 3 is such that a concentration of from 0.1 to 300 μmol/kg (≈0.0032 to 9.6 ppm for methanol) of alcohol, in particular methanol, is established in the downcomer 4 which adjoins the feedline 3 at the bottom. The optimum concentration of alcohol is dependent on various factors, such as the component material, the presence of precious metal doping, etc., and is therefore to be determined on a case-by-case basis for each individual reactor. In a specific embodiment, the concentration is set to less than 10 μmol/kg (≈0.32 ppm for methanol) which, in a given context, provides for an acceptable compromise with regard to good corrosion protection and virtually negligible disadvantages otherwise associated with the alcohol.

Figure 2:
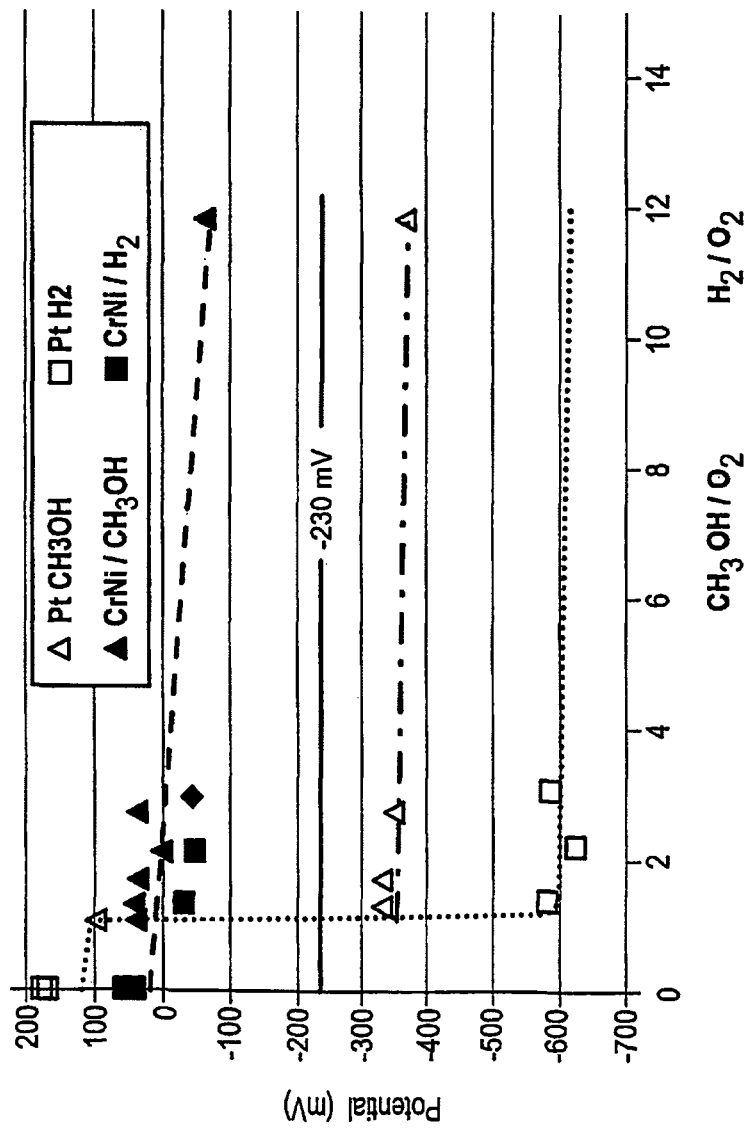
FIG. 2 is a diagrammatic chart showing the potentials of CrNi steel and Pt in the presence of $CH_3OH$ and hydrogen as reducing agents.

Tests using Pt and CrNi steel electrodes were carried out in order to test the theoretical effectiveness of the proposed method. The electrodes made from CrNi steel were subjected to preliminary oxidation for 500 hours at 280° C. with a water chemistry that corresponds to the conditions of use in the reactor. The CrNi steel electrodes which have been pretreated in this way and the Pt electrodes were arranged in an autoclave through which hot water at a temperature of 280° C. was flowing. The chemistry of the circulated water was set so as to correspond to the conditions in a boiling water reactor. The oxygen content was kept at between 0.2 and 2 ppm. The reducing agents used were methanol and, for comparison purposes, hydrogen. The potentials of the electrodes were determined as a function of the methanol or hydrogen content and are plotted in the diagram shown in FIG. 2 against the methanol/oxygen or hydrogen/oxygen molar ratio. In FIG. 2, the indication "CrNi" indicates CrNi steel. It can be seen that metering of methanol results in a protective action which is comparable to that achieved by metering hydrogen. In both cases, the Pt potential is reduced to below the protection potential of −230 mV. In the case of the undoped CrNi steel electrode, it is likewise possible to observe similar electrochemical activities with both methanol and hydrogen. However, in order in this case to reduce the potential to below the protection potential, it is necessary to establish significantly higher molar ratios. Therefore, it is necessary to operate with a lower oxygen content or with an excess of reducing agent. A potential of −500 mV was measured for an oxygen content of less than 10 ppb and a methanol content of 2 ppm (62.5 μmol/kg).

Although hydrogen and methanol or other alcohols, such as in particular ethanol or propanol, have similar electrochemical activities to hydrogen, their reactivity with respect to the strongly oxidizing OH radicals formed during the radiolysis of water is greater. A further advantage of the proposed method results from the significantly lower volatility of the alcohols in question. Whereas a large proportion of the hydrogen which is metered in is converted into the vapor phase, discharged with this phase and has to be catalytically oxidized as a non-condensable gas in the off-gas system of the reactor by adding stoichiometric quantities of oxygen, the proportion of alcohols which is converted into the vapor phase is lower. Moreover, the proportion of alcohol discharged with the vapor phase can be virtually completely condensed and thereby recycled to the reactor. Consequently, the outlay an chemicals, apparatus and control engineering measures is reduced compared to conventional methods.

What is claimed is:

1. A method for protecting components of a primary system of a boiling water reactor having a pressure vessel and a feedwater line opening out into the pressure vessel, the primary system being exposed to a primary coolant, the method comprising:
   doping surfaces of the components of the reactor with platinum; and
   continuously feeding an alcohol into the primary coolant to establish a desired concentration of the alcohol in the primary coolant, the desired concentration being such that the doping of the component surfaces and the continuously feeding of the alcohol provides corrosion protection potential of values lower than −230 mV for the component surfaces.

2. The method as recited in claim 1 wherein the alcohol is methanol.

3. The method as recited in claim 2 wherein continuously feeding the alcohol includes establishing a methanol/oxygen molar ratio in the primary coolant to provide corrosion protection potential of values lower than −230 mV for the component surfaces.

4. The method as recited in claim 1 wherein the components consist of a stainless steel.

5. The method as recited in claim 4 wherein the stainless steel is a CrNi steel.

6. The method as recited in claim 1 wherein the components consist of a Ni-base alloy.

7. The method as recited in claim 6 wherein the Ni-base alloy is Alloy 600.

8. The method as recited in claim 1 wherein the desired concentration of the alcohol in the primary coolant is lower than a concentration of alcohol required to provide corrosion protection potential of values lower than −230 mV for component surfaces of the reactor that are undoped.

9. A method for protecting components of a primary system of a boiling water reactor having a pressure vessel and a feedwater line opening out into the pressure vessel, the primary system being exposed to a primary coolant, the method comprising:
   doping surfaces of the components of the reactor with platinum; and
   continuously feeding an alcohol into the primary coolant to establish a desired concentration of the alcohol in the primary coolant, the desired concentration being dependent on the presence of the doping.

10. The method as recited in claim 9 wherein the alcohol is methanol.

11. The method as recited in claim 10 wherein continuously feeding the alcohol includes establishing a methanol/oxygen molar ratio in the primary coolant that is lower than a methanol/oxygen molar ratio in the primary coolant required to provide the same corrosion protection potential for component surfaces of the reactor that are undoped.

12. The method as recited in claim 9 wherein the components consist of a stainless steel.

13. The method as recited in claim 12 wherein the stainless steel is a CrNi steel.

14. The method as recited in claim 9 wherein the components consist of a Ni-base alloy.

15. The method as recited in claim 14 wherein the Ni-base alloy is Alloy 600.

* * * * *